US010648053B2

(12) United States Patent
Hamada et al.

(10) Patent No.: US 10,648,053 B2
(45) Date of Patent: May 12, 2020

(54) ROLLED FERRITIC STAINLESS STEEL SHEET, METHOD FOR PRODUCING THE SAME, AND FLANGE PART

(71) Applicant: NIPPON STEEL & SUMIKIN STAINLESS STEEL CORPORATION, Tokyo (JP)

(72) Inventors: Junichi Hamada, Tokyo (JP); Koji Ito, Tokyo (JP)

(73) Assignee: NIPPON STEEL & SUMIKIN STAINLESS STEEL CORPORATION, Tokyo (JP)

(*) Notice: Subject to any disclaimer, the term of this patent is extended or adjusted under 35 U.S.C. 154(b) by 343 days.

(21) Appl. No.: 15/128,891

(22) PCT Filed: Mar. 26, 2015

(86) PCT No.: PCT/JP2015/059470
§ 371 (c)(1),
(2) Date: Sep. 23, 2016

(87) PCT Pub. No.: WO2015/147211
PCT Pub. Date: Oct. 1, 2015

(65) Prior Publication Data
US 2017/0107593 A1 Apr. 20, 2017

(30) Foreign Application Priority Data
Mar. 26, 2014 (JP) .................. 2014-064779

(51) Int. Cl.
*C21D 9/46* (2006.01)
*C22C 38/60* (2006.01)
(Continued)

(52) U.S. Cl.
CPC ............... *C21D 9/46* (2013.01); *C21D 6/002* (2013.01); *C21D 8/0226* (2013.01);
(Continued)

(58) Field of Classification Search
CPC .......... C21D 2201/05; C21D 2211/005; C21D 6/002; C21D 8/0226; C21D 8/0263; C21D 9/46; F16L 23/032
(Continued)

(56) References Cited

U.S. PATENT DOCUMENTS

2003/0196735 A1  10/2003  Sugiura et al.
2014/0110022 A1   4/2014  Sano et al.
(Continued)

FOREIGN PATENT DOCUMENTS

EP    0573343 A1    12/1993
JP    2002-363693 A 12/2002
(Continued)

OTHER PUBLICATIONS

NPL: On-line English translation of JP2012-140688A, Jul. 2012 (Year: 2012).*
(Continued)

Primary Examiner — Jie Yang
(74) Attorney, Agent, or Firm — Birch, Stewart, Kolasch & Birch, LLP

(57) ABSTRACT

The present invention provides a rolled ferritic stainless steel material excellent in corrosion resistance and toughness, in particular suitable as a material for a flange and a method for producing the same and flange part. The rolled ferritic stainless steel material contains, by mass %, C: 0.001 to 0.08%, Si: 0.01 to 1.0%, Mn: 0.01 to 1.0%, P: 0.01 to 0.05%, S: 0.0002 to 0.01%, Cr: 10.0 to 25.0%, and N: 0.001 to 0.05%, has a balance of Fe and unavoidable impurities, has a thickness of 5 mm or more, and has an area ratio of crystal grains with a <011> direction within 15° from the rolling direction of 20% or more in a cross-section parallel to the rolling direction at any location between the left and right ends of the steel sheet.

7 Claims, 2 Drawing Sheets

(51) Int. Cl.
| | |
|---|---|
| C22C 38/00 | (2006.01) |
| C22C 38/02 | (2006.01) |
| C22C 38/04 | (2006.01) |
| C22C 38/06 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/30 | (2006.01) |
| C22C 38/32 | (2006.01) |
| C22C 38/44 | (2006.01) |
| C22C 38/46 | (2006.01) |
| C22C 38/48 | (2006.01) |
| C22C 38/50 | (2006.01) |
| C22C 38/52 | (2006.01) |
| C22C 38/54 | (2006.01) |
| C22C 38/18 | (2006.01) |
| C21D 6/00 | (2006.01) |
| C22C 38/40 | (2006.01) |
| C21D 8/02 | (2006.01) |
| C22C 38/42 | (2006.01) |
| F16L 23/032 | (2006.01) |

(52) U.S. Cl.
CPC ............ *C21D 8/0263* (2013.01); *C22C 38/00* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/60* (2013.01); *F16L 23/032* (2013.01); *C21D 8/02* (2013.01); *C21D 2201/05* (2013.01); *C21D 2211/005* (2013.01)

(58) Field of Classification Search
USPC ........................................................ 148/320
See application file for complete search history.

(56) References Cited

U.S. PATENT DOCUMENTS

| | | |
|---|---|---|
| 2014/0294660 A1 | 10/2014 | Kimura et al. |
| 2015/0020933 A1 | 1/2015 | Hamada et al. |

FOREIGN PATENT DOCUMENTS

| | | |
|---|---|---|
| JP | 2003/55738 A | 2/2003 |
| JP | 2005/120453 A | 5/2005 |
| JP | 2007-284783 A | 11/2007 |
| JP | 2009-30078 A | 2/2009 |
| JP | 2009-68034 A | 4/2009 |
| JP | 2009-263714 A | 11/2009 |
| JP | 2012-140687 A | 7/2012 |
| JP | 2012-140688 A | 7/2012 |
| JP | 2012-233229 A | 11/2012 |
| JP | WO 2013/085005 A1 | 6/2013 |
| JP | 2013-173998 A | 9/2013 |
| JP | 2013-209726 A | 10/2013 |
| WO | WO 2012/161241 A1 | 11/2012 |

OTHER PUBLICATIONS

International Preliminary Report on patentability for PCT/JP2015/059470 (PCT/IPEA/409) dated Apr. 6, 2016.
International Search Report for PCT/JP2015/059470 dated Apr. 21, 2015.
Written Opinion of the International Searching Authority for PCT/JP2015/059470 (PCT/ISA/237) dated Apr. 21, 2015.

* cited by examiner

# ROLLED FERRITIC STAINLESS STEEL SHEET, METHOD FOR PRODUCING THE SAME, AND FLANGE PART

TECHNICAL FIELD

The present invention provides a rolled ferritic stainless steel material of a thickness of 5 mm or more which prevents cracking at the time of steel sheet production and is excellent in corrosion resistance and toughness and which, in particular, is suitable as a flange material.

BACKGROUND ART

The path of exhaust gas of an automobile is comprises an exhaust manifold, muffler, catalyst, flexible tube, center pipe, front pipe, and various other parts. When connecting these parts, fastening parts called "flanges" are often used. In parts of exhaust systems of automobiles, flange connections are being positively employed since flanges enable reduction of the processing steps and simultaneously enable reduction of the work space. Further, from the viewpoint of the noise due to vibration and securing rigidity, thick flanges of 5 mm thickness or more are often used.

Flanges have in the past been produced by press-forming, stamping, and otherwise processing ordinary steel sheet. However, ordinary steel is inferior in corrosion resistance, so after manufacture of the automobile, rust called "initial rust" occurs and the beautiful appearance is ruined. Therefore, instead of ordinary steel sheet, use of stainless steel sheet is being positively promoted as a material for flange.

Ferritic stainless steel sheet has less of a content of Ni and is lower in cost than austenitic stainless steel sheet, so mainly ferritic stainless steel sheet is often used for flanges, but there was a problem of inferior toughness. If steel sheet is low in toughness, the problem arises that plate fracture ends up occurring when running steel strip or uncoiling steel strip at a steel sheet production line. Further, in flange-making, cracks sometimes occur at the time of cutting, stamping, and other processing. Furthermore, when impacted in a low temperature environment in the winter, the problem arises that a flange ends up cracking and the automobile exhaust pipe ends up breaking. 5 mm or more thick ferritic stainless steel sheet is particularly low in toughness in some cases, so there was the issue that the reliability for use of the thick ferritic stainless steel sheet for the production of a flange was too low.

Therefore, to use the thick ferritic stainless steel sheet to produce a flange, the toughness of the steel sheet, in particular the toughness of the hot rolled steel sheet or hot rolled annealed and pickled steel sheet has to be improved. Several attempts have been made to solve the problems relating to the toughness of ferritic stainless steel sheet.

For example, PLTs 1 and 2 disclose manufacturing conditions for mass production of thickness 5 to 12 mm ferritic stainless steel hot rolled coil or hot rolled annealed coil. PLT 1 relates to Ti-containing ferritic stainless steel and shows the method of adjusting the hardness and Charpy impact value by making the coiling temperature 570° C. or more and dipping the coil in water. Further, PLT 2 relates to Nb-containing ferritic stainless steel and shows the method of adjusting the hardness and Charpy impact value by making the hot rolling finishing temperature 890° C. or more, coiling at 400° C. or less, and dipping the coil in water. The arts disclosed in PLTs 1 and 2 define the hot rolling conditions from the viewpoint of improvement of the toughness of the hot rolled plate or hot rolled annealed steel sheet, but control of the total length of a coil to the above conditions was difficult and the factors in metal structure for improvement of toughness were unknown.

Further, PLT 3 discloses ferritic stainless steel excellent in cold crack resistance obtained by making the length of subgrain boundaries with a small crystal misorientation of the ferrite phase a constant value or more. This ferritic stainless steel is obtained by the method of making the hot rolling finishing temperature 800 to 1000° C., making the coiling temperature over 650° C. to 800° C., and dipping in a water tank after coiling. Further, PLT 4 discloses ferritic stainless steel sheet excellent in toughness defining the ratio of the precipitates at the grain boundaries. The arts disclosed in PLTs 3 and 4 control the properties of the crystal grain boundaries and precipitates on the crystal grain boundaries so as to try to improve the toughness, but a level of toughness sufficient for a material for a flange has not necessarily been realized.

CITATION LIST

Patent Literature

PLT 1. Japanese Patent Publication No. 2012-140687A
PLT 2. Japanese Patent Publication No. 2012-140688A
PLT 3. WO2013/085005A
PLT 4. Japanese Patent Publication No. 2009-263714A

SUMMARY OF INVENTION

Technical Problem

An object of the present invention is to solve the problem of the existing art and efficiently produce rolled ferritic stainless steel material for flange excellent in toughness.

Solution to Problem

To solve this problem, it is necessary to control the factors having an effect on toughness other than the above. In the present invention, the inventors proceeded with intensive research on this point. That is, the inventors engaged in detailed research relating to the low temperature toughness of ferritic stainless steel sheet from the viewpoints of the structure and crystallography in the components and process of production. As a result, they discovered to improve the toughness of for example 5 mm or more thick ferritic stainless steel sheet, in particular hot rolled steel sheet or hot rolled annealed steel sheet, it is extremely effective to control the direction of the crystal orientation of the matrix phase.

The gist of the present invention to solve the above problems lies in:
(1) A hot rolled steel sheet or a hot rolled steel strip comprised of ferritic stainless steel material containing, by mass %, C: 0.001 to 0.08%, Si: 0.01 to 1.0%, Mn: 0.01 to 1.0%, P: 0.01 to 0.05%, S: 0.0002 to 0.01%, Cr: 10.0 to 25.0%, and N: 0.001 to 0.05%, having a balance of Fe and unavoidable impurities, having a thickness of 5 mm or more, and having an area ratio of crystal grains with a <011> direction within 15° from the rolling direction of 20% or more in a cross-section parallel to the rolling direction at any location between the left and right ends of the steel sheet.
(2) The hot rolled steel sheet or the hot rolled steel strip comprised of ferritic stainless steel material according to (1), wherein in a cross-section parallel to the rolling direction at any location between the left and right ends of the steel sheet, a sum of the lengths of low-angle grain boundaries with a crystal misorientation of less than 15° is 10% or more with respect to a sum of lengths of the crystal grain boundaries.

(3) The hot rolled steel sheet or hot rolled steel strip comprised of ferritic stainless steel material according to (1) or (2), further containing, by mass %, one type or two types or more of Ti: 0.01 to 0.4%, Nb: 0.01 to 0.6%, B: 0.0002 to 0.0030%, Al: 0.005 to 0.3%, Ni: 0.1 to 1%, Mo: 0.1 to 2.0%, Cu: 0.1 to 3.0%, V: 0.05 to 1.0%, Mg: 0.0002 to 0.0030%, Sn: 0.01 to 0.3%, Sb: 0.01 to 0.3%, Zr: 0.01 to 0.1%, Ta: 0.01 to 0.1%, Hf: 0.01 to 0.1%, W: 0.01 to 2.0%, Co: 0.01 to 0.2%, Ca: 0.0001 to 0.0030%, REM: 0.001 to 0.05%, and Ga: 0.0002 to 0.1%, and having an Mn content of 0.01 to 0.5%.

(4) A hot rolled annealed steel sheet or a hot rolled annealed steel strip comprised of ferritic stainless steel material containing, by mass %, C: 0.001 to 0.08%, Si: 0.01 to 1.0%, Mn: 0.01 to 1.0%, P: 0.01 to 0.05%, S: 0.0002 to 0.01%, Cr: 10.0 to 25.0%, and N: 0.001 to 0.05%, having a balance of Fe and unavoidable impurities, having a thickness of 5 mm or more, and having an area ratio of crystal grains with a <011> direction within 15° from the rolling direction of 20% or more in a cross-section parallel to the rolling direction at any location between the left and right ends of the steel sheet.

(5) The hot rolled annealed steel sheet or the hot rolled annealed steel strip comprised of ferritic stainless steel material according to (4), wherein in a cross-section parallel to the rolling direction at any location between the left and right ends of the steel sheet, a sum of the lengths of low-angle grain boundaries with a crystal misorientation of less than 15° is 10% or more with respect to a sum of lengths of the crystal grain boundaries.

(6) The hot rolled annealed steel sheet or hot rolled annealed steel strip comprised of ferritic stainless steel material according to (4) or (5), further containing, by mass %, one type or two types or more of Ti: 0.01 to 0.4%, Nb: 0.01 to 0.6%, B: 0.0002 to 0.0030%, Al: 0.005 to 0.3%, Ni: 0.1 to 1%, Mo: 0.1 to 2.0%, Cu: 0.1 to 3.0%, V: 0.05 to 1.0%, Mg: 0.0002 to 0.0030%, Sn: 0.01 to 0.3%, Sb: 0.01 to 0.3%, Zr: 0.01 to 0.1%, Ta: 0.01 to 0.1%, Hf: 0.01 to 0.1%, W: 0.01 to 2.0%, Co: 0.01 to 0.2%, Ca: 0.0001 to 0.0030%, REM: 0.001 to 0.05%, and Ga: 0.0002 to 0.1%.

(7) A method of production of the hot rolled steel sheet or the hot rolled steel strip comprised of ferritic stainless steel according to any one of (1) to (3), comprising performing a hot rolling process making a hot rolling finishing temperature 800° C. to 900° C. and a coiling process at a coiling temperature of 500° C. or less.

(8) The method of production of the hot rolled annealed steel sheet or the hot rolled annealed steel strip comprised of ferritic stainless steel according to any one of (4) to (6), comprising performing a hot rolling process making a hot rolling finishing temperature 800° C. to 900° C. and a coiling process at a coiling temperature of 500° C. or less.

(9) The method of production of the hot rolled annealed steel sheet or the hot rolled annealed steel strip comprised of ferritic stainless steel according to any one of (4) to (6), comprising heating and annealing by a heating rate of 10° C./sec or more to 800° C. to 1000° C. after hot rolling, then cooling by a cooling rate of 10° C./sec or more.

(10) The method of production of the hot rolled annealed steel sheet or the hot rolled annealed steel strip comprised of ferritic stainless steel according to (8), comprising heating by a heating rate of 10° C./sec or more to 800° C. to 1000° C., then annealing, then cooling by a cooling rate of 10° C./sec or more.

(11) The hot rolled steel sheet or hot rolled steel strip comprised of ferritic stainless steel according to any one of (1) to (3) used as a flange part.

(12) The hot rolled annealed steel sheet or hot rolled annealed steel strip comprised of ferritic stainless steel according to any one of (4) to (6) used as a flange part.

(13) A ferritic stainless steel flange part comprised of a flange part made of hot rolled steel sheet or hot rolled steel strip comprised of ferritic stainless steel according to any one of (1) to (3), wherein the impact energy at −20° C. is 125 J or more.

(14) A ferritic stainless steel flange part comprised of a flange part made of the hot rolled annealed steel sheet or the hot rolled annealed steel strip comprised of ferritic stainless steel according to any one of claims 4 to 6, wherein the impact energy at −20° C. is 125 J or more.

Advantageous Effects of Invention

According to the present invention, it is possible to efficiently produce rolled ferritic stainless steel material for flange excellent in toughness without requiring new facilities.

DESCRIPTION OF EMBODIMENTS

Below, the reasons for limitation of the present invention will be explained. The crystal grain refinement and the precipitate refinement and softening contribute to improvement of the toughness, but large amounts of additional elements are required and it was difficult to secure sufficient toughness for using thickness 5 mm or more thick ferritic stainless hot rolled plate or hot rolled annealed steel sheet for the production of flanges.

In the present invention, the crystal orientation of the matrix phase comprised of the ferrite phase was focused on and the relationship between the crystal orientation of the matrix phase and the toughness was investigated in detail. As a result, the inventors discovered that the toughness of the steel sheet is improved by forming crystal grains with a stable orientation of crystal grains of the <011> direction of within 15° from the rolling direction (below, also referred to as the "<011> oriented grain") by an area ratio of 20% or more.

Figure 1:
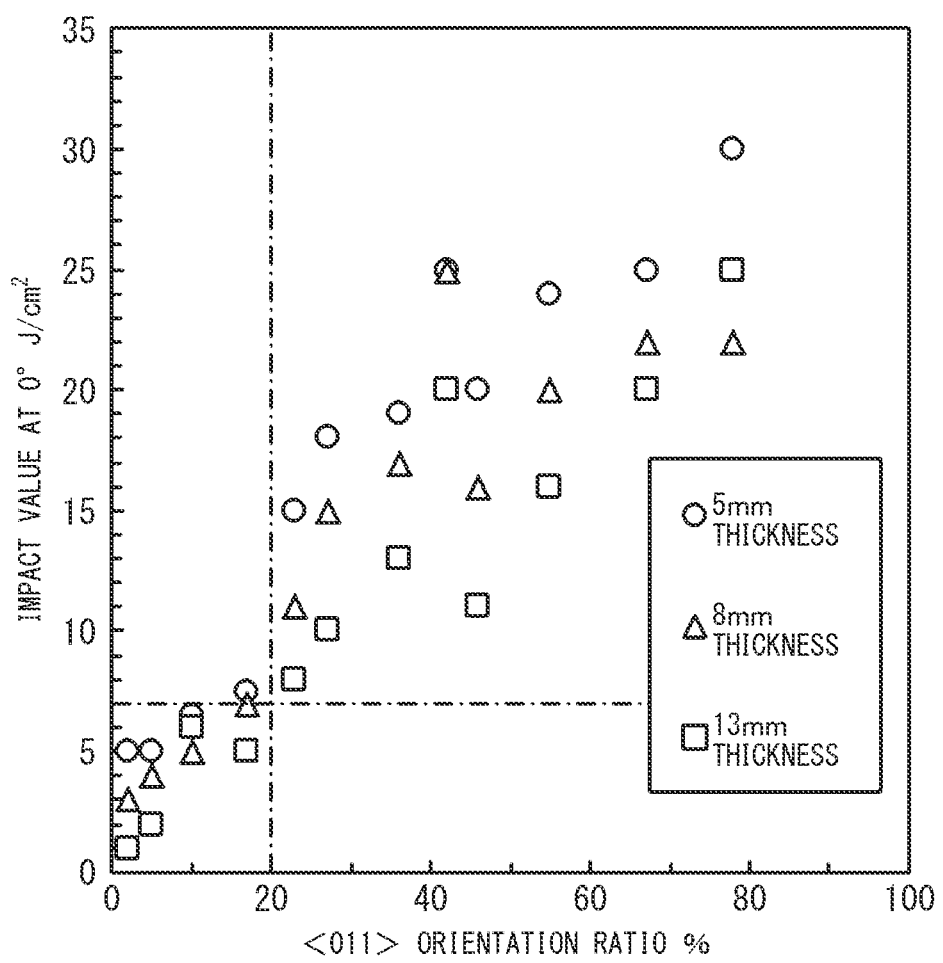
FIG. 1 is a view showing the relationship between the <011> oriented grain ratio and Charpy impact value.

FIG. 1 shows the relationship between the <011> oriented grain ratio of the hot rolled plate or hot rolled annealed steel sheet of steel with a different thickness produced by various processes (17% Cr-0.34% Nb-0.005% C-0.01% N) and the Charpy impact value. Here, the crystal orientation was measured using EBSP (electron back-scattering diffraction pattern), by which the orientation for every crystal grain per unit area from the cross-section of all thicknesses parallel to the rolling direction between the two ends of the left and right of the hot rolled steel sheet or hot rolled annealed steel sheet was measured, and the area ratio of crystal grains with a <011> direction per unit area of the cross-section within 15° from the rolling direction (below, also referred to as the "<011> oriented grain ratio") was measured. Further, the Charpy impact value was measured using a V-notch test piece taken from hot rolled annealed steel sheet (giving V-notch in width direction) and measuring the value based on JISZ2242 at 0° C.

As shown in FIG. 1, if the <011> oriented grain ratio is 20% or more, the Charpy impact value is improved and the toughness becomes excellent. Here, "excellent toughness" means having an impact value at 0° C. of 7 J/cm$^2$ or more and no brittle fracture at the time of uncoiling a hot rolled coil and at the time of running the plate. The cleavage surface of ferrite steel is the {100} plane. It is known that brittle fracture occurs along this plane, but if <011> oriented grains grow, the angle formed by the crack propagation direction and cleavage surface becomes greater, so the resistance to cleavage fracture becomes larger and the toughness value is improved.

Furthermore, in the present invention, it was discovered that the ratio of the sum of the lengths of low-angle grain boundaries with a crystal misorientation of less than 15° with respect to the sum of the lengths of the crystal grain boundaries has an effect on the toughness. This feature is an important structural feature for improving the toughness along with the above-mentioned <011> oriented grain ratio. In general, the dislocations introduced by the processing (for example, hot-rolling) are rearranged in the processes of restoration of the dislocations and recrystallization of the material. In the stage of restoration, crystal grains surrounded by low-angle grain boundaries with a crystal misorientation of less than 15° (below, referred to as the subgrains") are formed, while coarse crystal grains surrounded by high angle grain boundaries of 15° or more are formed in the recrystallation process. Usually, due to recrystallization heat treatment, the ratio of high angle grain boundaries is increased and the low-angle grain boundaries are decreased, but the high angle grain boundaries move and grow remarkably fast, so the toughness falls due to the coarsening of the grain size.

In the present invention, it was discovered that by forming the subgrains so that the sum of the lengths of the low-angle grain boundaries becomes 10% or more of the sum of the lengths of the crystal grains at the cross-section, this suppresses movement and growth of the grain boundaries and effectively acts as resistance to brittle cracking. That is, they discovered that when the <011> oriented grain ratio is 20% or more, and subgrains are formed so that the sum of the lengths of the low-angle grain boundaries becomes 10% or more of the sum of lengths of crystal grain boundaries at the cross-section, it is possible to improve the Charpy impact value at 0° C. to 11 J/cm$^2$ or more. By improving the Charpy impact value at 0° C. to 11 J/cm$^2$ or more, it is possible to secure a toughness whereby no cracking occurs at the time of flange-making.

The ratio of the lengths of the low-angle grain boundaries of less than 15° with respect to the sum of the lengths of crystal grain boundaries at the cross-section can be measured by the above EBSP orientation analysis and can be measured by a method similar to the above method of measurement of the <011> oriented grain ratio. Further, the measurement of the <011> oriented grain ratio and the ratio of low-angle grain boundaries of less than 15° performed using EBSP is desirably performed over the cross-section of the entire thickness of a length 1.0 mm parallel to the rolling direction at any location between the two left and right ends of the hot rolled steel sheet or hot rolled annealed steel sheet. Further, if considering the ductility of the steel sheet, 20% or more is desirable.

Next, the ranges of components of the steel will be explained. The % of the contents of the components means the mass %.

C causes degradation of the toughness by the hardening by solid solution C and precipitation of carbides, so the smaller the content the better. Further, if the content of C is over 0.08%, randomness of the crystal orientation occurs due to the formation of carbides and the growth of <011> oriented grains is suppressed, so the upper limit is made 0.08%. However, excessive reduction leads to an increase of the refining costs, so the lower limit of the content of C is made 0.001%. Furthermore, if considering the manufacturing cost, corrosion resistance, and toughness of hot rolled sheet, 0.002% to 0.015% is desirable.

Si is sometimes added as a deoxidizing element and also gives rise to improvement of the oxidation resistance, but is a solution strengthening element, so from the viewpoint of the toughness, the smaller the better. Further, if the content of Si is over 1.0%, due to the changes in the slip system, growth of <011> oriented grains is suppressed, so the upper limit is made 1.0%. On the other hand, to secure oxidation resistance, the lower limit is made 0.01%. However, excessive reduction of the content of Si leads to an increase in the refining costs, so considering the material quality and initial rust resistance, 0.05% to 0.9% is desirable.

Mn, like Si, is a solution strengthening element, so in terms of material quality, the smaller the content the better. Further, if over 1.0%, the formation of precipitates of MnS etc. causes randomness in crystal orientation and suppresses growth of <011> oriented grains, so the upper limit of Mn content is made 1.0%. On the other hand, excessive reduction of the Mn content leads to an increase in refining costs, but addition of a trace amount of Mn has the effect of improvement of scale removal, so the lower limit is made 0.01%. Furthermore, if considering the material quality and manufacturing costs, 0.1% to 0.5% is desirable.

P, like Mn and Si, is a solution strengthening element and causes the material to harden, so from the viewpoint of the toughness, the smaller the content the better. Further, if the content of P is over 0.05%, the formation of phosphides causes randomness in the crystal orientation and suppresses growth of <011> oriented grains, so the upper limit is made 0.05%. However, excessive reduction leads to an increase in the cost of materials, so the lower limit is made 0.01%. Furthermore, if considering the manufacturing costs and corrosion resistance, 0.015% to 0.03% is desirable.

S is an element degrading the corrosion resistance, so the smaller the content the better. Further, if the content of S is over 0.01%, randomness of the crystal orientation occurs due to the MnS, $Ti_4C_2S_2$, and other precipitates and growth of the <011> oriented grains is suppressed, so the upper limit is made 0.01%. On the other hand, S bonds with the Mn or Ti and has the effect of improving the stampability in flange-making. This effect is expressed from a content of S of 0.0002%, so the lower limit is made 0.0002%. Furthermore, if considering the refining costs and the suppression of crevice corrosion at a time when the stainless steel is made into a fuel part, the content of S is desirably 0.0010% to 0.0060%.

Cr is an element for improving the corrosion resistance and oxidation resistance. If considering the salt damage resistance demanded from a flange, 10.0% or more is necessary. On the other hand, excessive addition of Cr results in hardening and causes the formability and toughness to deteriorate. Further, if the content of Cr is over 25.0%, randomness of the crystal orientation occurs due to the precipitation of coarse Cr carbides and nitrides and other precipitates and growth of the <011> oriented grains is suppressed, so the upper limit is made 25.0%. Further, if considering the manufacturing costs and plate fracture at the time of production due to deterioration of the toughness, 10.0% to 18.0% is the desirable content of Cr.

N, like C, causes the toughness and corrosion resistance to deteriorate, so the smaller the content the better. Further, if the content of N is over 0.05%, randomness of the crystal orientation occurs due to the formation of nitrides and growth of <011> oriented grains is suppressed, so the upper limit is made 0.05%. However, excessive reduction of the content of N leads to an increase in the refining costs, so the lower limit is made 0.001%. Furthermore, if considering the manufacturing costs and workability and the initial rusting, 0.005 to 0.02% is desirable.

Furthermore, the present invention preferably optionally contains the elements shown below.

Ti bonds with C, N, and S and is an element added according to need so as improve the corrosion resistance, grain-boundary corrosion resistance, and toughness. The action of fixing C and N appears from 0.01%, so the lower limit is made 0.01%. Further, addition of over 0.4% of Ti causes hardening and also leads to precipitation of coarse Ti(C,N) compounds and remarkable deterioration of the toughness and also suppresses the growth of the <011> oriented grains. Therefore, the upper limit of the content of Ti is made 0.4%. Furthermore, if considering the manufacturing costs etc., 0.05% to 0.25% is desirable.

Nb is added as necessary for improving the high temperature strength and also, like Ti, bonding with C or N to improve the corrosion resistance, grain-boundary corrosion resistance, and toughness. This action is expressed when the content of Nb is 0.01% or more, so the lower limit is made 0.01%. However, if excessively adding Nb, the steel sheet is hardened and the formability of the steel sheet is degraded. In addition, coarse Nb(C,N) compounds and, depending on the heat history, $(Fe,Nb)_6C$ and $Fe_2Nb$ precipitate and cause remarkably deterioration of the toughness of the steel sheet. Also, growth of the <011> oriented grains to be suppressed. Therefore, the upper limit is made 0.6%. Further, if considering the material costs and crevice corrosion ability, 0.1% to 0.45% is desirable.

B is an element segregating at the grain boundaries and thereby improving the secondary workability of the product. To improve the stampability of the flange, it is added according to need. This action is expressed when the content of B is 0.0002% or more, so the lower limit of the content of B is made 0.0002%. However, excessive addition of B causes borides to precipitate and degrades the toughness of the steel sheet and, in addition, suppresses the growth of <011> oriented grains, so the upper limit is made 0.0030%. Furthermore, if considering the cost and the drop in ductility, 0.0003% to 0.0010% is desirable.

Al is sometimes added as a deoxidizing element. Its action is expressed from a 0.005% or more Al content, so the lower limit is made 0.005%. Further, addition of 0.3% or more of Al causes a drop in the toughness of the steel sheet and degrades the weldability and surface quality and also suppresses the growth of <011> oriented grains, so the upper limit is made 0.3%. Furthermore, if considering the refining costs, 0.01% to 0.1% is the desirable content of Al.

Ni suppresses crevice corrosion and promotes repassivation to thereby improve the initial rust resistance, so is added as required. This action is expressed when the content of Ni is 0.1% or more, so the lower limit is made 0.1%. However, excessive addition causes hardening and degrades the formability. In addition, it suppresses the growth of <011> oriented grains and makes stress corrosion cracking occur more easily, so the upper limit is made 1%. Further, if considering the material cost, 0.1% to 0.5% is desirable.

Mo is an element improving the corrosion resistance and high temperature strength. In particular, it is an element necessary for suppressing crevice corrosion when a flange part has a gap structure. This action is expressed when the content of Mo becomes 0.1% or more, so the lower limit is made 0.1%. Further, if the Mo content exceeds 2.0%, the formability remarkably deteriorates, the toughness at the time of manufacture deteriorates, and the growth of <011> oriented grains is suppressed, so the upper limit is made 2.0%. Furthermore, if considering the manufacturing costs, 0.1% to 1.2% is desirable.

Cu is added as needed not only to improve the high temperature strength, but also to suppress crevice corrosion and promote repassivation. This action is expressed when the content of Cu becomes 0.1% or more, so the lower limit is made 0.1%. However, excessive addition, by precipitation of ε-Cu, hardens the steel sheet and degrades the formability and toughness of the steel sheet and, further, suppresses the growth of <011> oriented grains, so the upper limit is made 3.0%. Further, if considering the pickling ability etc. at the time of manufacture, 0.1% to 1.2% is desirable.

V is added not only to suppress the crevice corrosion, but also to contribute to improvement of toughness by addition in a small amount. This action is expressed from a content of V of 0.05% or more, so the lower limit is made 0.05%. However, excessive addition of V not only hardens the steel sheet and degrades the formability of the steel sheet but also causes the precipitation of coarse V(C,N) compounds which lead to a deterioration of the toughness of the steel sheet and suppression of growth of <011> oriented grains, so the upper limit is made 1.0%. Further, if considering the material costs and initial rusting, 0.07% to 0.2% is desirable.

Mg is an element which sometimes is added as a deoxidizing element and, in addition makes the structure of the slab finer and contributes to improvement of the formability. Further, Mg oxides form sites for precipitation of Ti(C,N) compounds, Nb(C,N) compounds, and other carbonitrides. Mg oxides have the effect of causing fine dispersion and precipitation of these. This action is expressed with a content of V of 0.0002% or more and contributes to improvement of the toughness, so the lower limit is made 0.0002%. However, excessive addition leads to deterioration of the weldability and corrosion resistance. In addition, excessive addition leads to the formation of coarse precipitates which lead to suppression of <011> oriented grains, so the upper limit is made 0.0030%. If refining the refining costs, 0.0003% to 0.0010% is desirable.

Sn and Sb contribute to improvement of the corrosion resistance and high temperature strength, so 0.01% or more is added in accordance with need. By adding over 0.3%, sometimes the slab cracks at the time of production of the steel sheet and, in addition, the growth of <011> oriented grains is suppressed, so the upper limit is made 0.3%. Furthermore, if considering the refining costs or manufacturability, 0.01% to 0.15% is desirable.

Zr, Ta, and Hf bond with C and N and are added in 0.01% or more in accordance with need to contribute to improvement of the toughness. However, addition over 0.1% results in an increase in costs and also leads to remarkable deterioration of the manufacturability and suppression of growth of the <011> oriented grains, so the upper limit is made 0.1%. Furthermore, if considering the refining costs and manufacturability, 0.01% to 0.08% is desirable.

W contributes to the improvement of the corrosion resistance and high temperature strength, so is added in 0.01% in accordance with need. Adding over 2.0% leads to deterioration of the toughness at the time of production of the steel sheet and to suppression of growth of the <011> oriented grains and increase of costs, so the upper limit is made 2.0%. Furthermore, if considering the refining costs and manufacturability, 0.01% to 1.0% is desirable.

Co contributes to improvement of the high temperature strength, so is added in 0.01% or more in accordance with need. Addition of over 0.2% leads to deterioration of the toughness at the time of production of the steel sheet and to suppression of growth of <011> oriented grains and increased costs, so the upper limit is made 0.2%. Furthermore, if considering the refining costs and manufacturability, 0.01% to 0.1% is desirable.

Ca is sometimes added for desulfurization. The effect appears at a content of Ca of 0.0001% or more, so the lower limit is made 0.0001%. However, addition of over 0.0030% causes coarse CaS to be formed, the toughness and corrosion resistance to deteriorate, and the growth of <011> oriented grains to be suppressed, so the upper limit is made 0.0030%. Furthermore, if considering the refining costs and manufacturability, 0.0003 to 0.0020% is desirable.

An REM (rare earth metal) is sometimes added as needed from the viewpoint of improvement of the toughness or improvement of the oxidation resistance due to refinement of various precipitates. This effect appears with an REM content of 0.001% or more. However, addition of over 0.05% causes the casting ability to remarkably deteriorate and, further, suppresses the growth of <011> oriented grains, so the upper limit is made 0.05%. Furthermore, if considering the refining costs and manufacturability, 0.001 to 0.01% is desirable. Further, in the present invention, REM, in accordance with the general definition, is the general term for the two elements of scandium (Sc) and yttrium (Y) and the 15 elements (lanthanoids) of lanthanum (La) to lutetium (Lu). These may be added alone or may be mixtures.

Ga may be added in 0.1% or less for improving corrosion resistance and suppressing hydrogen embrittlement. From the viewpoint of the formation of sulfides or hydrides, the lower limit of content of Ga is made 0.0002%. Preferably, it is 0.0010% or more. Furthermore, from the viewpoint of the manufacturability and cost and from the viewpoint of the growth of <011> oriented grains, 0.0040% or less is preferable.

The other components are not particularly prescribed in the present invention, but in the present invention, Bi etc. may be added in accordance with need to 0.001% to 0.1%. Note that, As, Pb, and other generally harmful elements or impurity elements are preferably reduced as much as possible.

Next, the method of production will be explained. The rolled steel material of the present invention is produced by a steelmaking-hot rolling, steelmaking-hot rolling-pickling, or steelmaking-hot rolling-annealing-pickling process. In steelmaking, the method of smelting steel containing the above essential components and components added in accordance with need in a converter then secondarily smelting the steel is suitable. The smelted molten steel is made into a slab in accordance with a known casting method (continuous casting). The slab is heated to a predetermined temperature and hot rolled to a predetermined thickness by continuous rolling.

In the present invention, the finishing temperature in hot rolling and the coiling temperature are prescribed. The higher temperature the finishing temperature of the hot rolling becomes, the more the deformation strain of the ferrite phase is removed after final rolling and the more restoration of the structure is promoted. Subgrains are formed so that the <011> direction changes from the rolling direction to within 15°, and the toughness of the steel sheet is improved. On the other hand, with a finishing temperature of less than 800° C., the crystal grains having an orientation other than the <011> oriented grains (<001> direction etc.) end up being formed due to the hot rolling shear strain. By making the finishing temperature 800° C. or more, the formation and growth of crystal grains of other orientations are suppressed and subgrains comprised of <011> oriented grains can be formed so that the area ratio of the subgrains with respect to the cross-section of the entire plate thickness becomes 20% or more, so the finishing temperature is made 800° C. or more. However, an excessive increase in the finishing temperature suppresses the growth of <011> oriented grains and also leads to a drop in the pickling ability, so the upper limit of the finishing temperature is made 900° C. Furthermore, if considering the surface defects, 810 to 880° C. is desirable.

After the final rolling in the hot rolling process, a coiling process is performed at 500° C. or less. If performing the coiling process at an over 500° C. high temperature, precipitates causing a drop in toughness are formed, embrittlement occurs at 475° C., and the steel strip is made a low toughness, so the upper limit of the initial process is made 500° C. Further, to suppress the rotation of the crystal orientation of the <011> oriented grains as subgrains formed at the time of the final rolling performed at a finishing temperature of 800° C. or more and prevent formation of a recrystallized structure, it is necessary to make the upper limit of the temperature of the coiling process 500° C. However, excessive decrease in the temperature of the coiling process causes poor coil shape, so the lower limit of the temperature of the coiling process is made 200° C. Furthermore, if considering the shape stability and pickling ability, the coiling process is desirably performed at 300° C. to 450° C. Further, the thickness of the hot rolled plate is made the 5 mm or more, which is usually used for flanges, but if excessively made thicker, the toughness sharply falls, so preferably 5 mm to 20 mm is desirable. Furthermore, 6 mm to 15 mm is desirable.

If running the plate through an annealing-pickling process after hot rolling, the annealing conditions are defined. Along with the rise of the annealing temperature, restoration and recrystallization proceed and <011> oriented grains are reduced. To suppress this action, the steel is heated to 800 to 1000° C. If the annealing temperature is less than 800° C., the worked structure at the time of the hot rolled process remains, restoration does not sufficiently proceed, and the steel sheet becomes hard, so the toughness of the steel sheet becomes poor. Further, if the annealing temperature is over 1000° C., the grain growth after the end of recrystallization remarkably proceeds and randomness of the crystal orientation proceeds resulting in the reduction of the <011> oriented grains, so the toughness of the steel sheet remarkably deteriorates. Further, from the viewpoint of formation of solid solutions of the precipitates, suppression of coarsening of the crystal grains, and remaining presence of <011> oriented grains, annealing at 850 to 950° C. is desirable.

When heating the steel sheet or steel strip to the annealing temperature, the heating rate is made 10° C./sec or more. If the heating rate is slower than this, recrystallization proceeds resulting in subgrains being consumed and crystal grains become coarser. The <011> oriented grains are reduced and the toughness of the steel sheet is degraded. When the heating rate is less than 10° C./sec, the <011> oriented grains decrease because other oriented grains end up being formed during the heating and the <011> oriented grains are corroded along with the growth of the other orientations. In particular, the <112> and <100> oriented grains grew and it became difficult to make the ratio of <011> oriented grains present 20% or more.

Further, the cooling rate is made 10° C./sec or more, but this suppresses the formation of precipitates causing the deterioration of toughness in the cooling process. Further, if the cooling rate is less than 10° C./sec, a change occurring in the crystal orientation in the cooling process reduces the <011> oriented grain ratio. Furthermore, if considering the productivity, the heating rate is preferably 15° C./sec or more and the cooling rate is preferably 15° C./sec or more. Note that, if the chemical composition of the present invention, a sufficient effect is exhibited by the above cooling rate. Even if cooling by a cooling rate faster than the above rate (for example, by 50° C./sec or more), the effect of the present invention becomes saturated. In the present invention, if considering the surface quality, the shape of the steel sheet, and manufacturing costs, the cooling rate is preferably made less than 50° C./sec.

The hot rolled steel sheet or hot rolled steel strip of the present invention is formed of the rolled ferritic stainless steel material having the components of the present invention and produced by the hot rolling process. The hot rolled annealed steel sheet or hot rolled annealed steel strip of the present invention is formed of the rolled ferritic stainless steel material having the components of the present invention and annealed after the hot rolling. The hot rolled steel sheet or hot rolled steel strip of the present invention or the hot rolled annealed steel sheet or hot rolled annealed steel strip of the present invention each have a Charpy impact value measured at 0° C. based on JISZ2242 of 11 J/cm$^2$ or more and secures a toughness by which no cracking occurs at the time of flange-making.

Further, as shown in the later explained examples, the flange part produced from the rolled ferritic stainless steel material of the present invention is excellent in low temperature toughness without cracking due to being given a 125 J or less impact energy at −20° C.

EXAMPLES

Molten steels of the chemical compositions shown in Table 1-1 and Table 1-2 were smelted and cast into slabs. The slabs were hot rolled to 5 mm thicknesses or more to produce hot rolled coils. The hot rolled coils were produced by controlling the hot rolling finishing temperature to 810 to 880° C. and the coiling temperature to 300 to 450° C. After that, as shown in Table 1-1 and Table 1-2, annealed coils were produced. As conditions of the annealing process, the annealing temperature was made 850 to 950° C. and the heating rate and cooling rate were both made 15° C./sec. The samples for evaluation of the crystal orientation and the test pieces for Charpy impact tests were taken from these hot rolled plates or hot rolled annealed steel sheets. Between the two left and right ends of the hot rolled steel sheets or hot rolled annealed steel sheets, cross-sections of lengths 1.0 mm parallel to the rolling direction and entire thicknesses were exposed as specimens. The exposed cross-sections were measured for orientation for each crystal grain using EBSP and measured for area ratio of crystal grains with a <011> direction within 15° from the rolling direction (<011> oriented grain ratio) (area %). Further, the ratio of the lengths of the low-angle grain boundaries having a crystal misorientation of less than 15° at the cross-section measured for the <011> oriented grain ratio and the sum of the crystal grain boundaries at the cross-section of the entire thickness. The Charpy impact test was conducted by the above method based on JISZ2242. Further, in Table 1-2, the notation "*" denotes outside the present invention.

TABLE 1-1

| | No. | C | Si | Mn | P | S | Cr | N | Ti | Nb | B | Al | Ni | Mo | Cu | V | Mg |
|---|---|---|---|---|---|---|---|---|---|---|---|---|---|---|---|---|---|
| Invention example | A1 | 0.005 | 0.43 | 0.32 | 0.023 | 0.0006 | 10.7 | 0.008 | 0.18 | — | — | — | — | — | — | — | — |
| | A2 | 0.062 | 0.35 | 0.51 | 0.032 | 0.0046 | 16.2 | 0.035 | — | — | — | — | — | — | — | — | — |
| | A3 | 0.075 | 0.25 | 0.42 | 0.030 | 0.0021 | 16.5 | 0.033 | — | — | — | 0.08 | — | — | — | — | — |
| | A4 | 0.011 | 0.33 | 0.13 | 0.023 | 0.0007 | 17.3 | 0.018 | — | 0.42 | — | 0.03 | — | — | — | — | — |
| | A5 | 0.004 | 0.06 | 0.07 | 0.025 | 0.0008 | 17.2 | 0.011 | 0.21 | — | 0.0005 | — | — | — | — | — | — |
| | A6 | 0.005 | 0.07 | 0.03 | 0.026 | 0.0010 | 17.4 | 0.013 | — | 0.38 | 0.0003 | 0.06 | — | 0.8 | — | — | — |
| | A7 | 0.008 | 0.91 | 0.35 | 0.030 | 0.0005 | 13.9 | 0.009 | — | 0.42 | — | 0.03 | 0.1 | — | — | 0.07 | — |
| | A8 | 0.005 | 0.07 | 0.09 | 0.024 | 0.0010 | 17.2 | 0.013 | 0.21 | — | 0.0010 | 0.09 | — | 1.1 | — | 0.10 | 0.0006 |
| | A9 | 0.009 | 0.45 | 0.15 | 0.021 | 0.0007 | 21.1 | 0.019 | — | 0.43 | — | 0.07 | 0.3 | — | 0.4 | — | — |
| | A10 | 0.013 | 0.22 | 0.27 | 0.022 | 0.0007 | 18.9 | 0.016 | 0.09 | 0.35 | 0.0007 | 0.12 | 0.2 | — | 0.3 | 0.12 | 0.0004 |
| | A11 | 0.006 | 0.23 | 0.96 | 0.031 | 0.0008 | 17.6 | 0.014 | 0.07 | 0.46 | 0.0005 | 0.06 | — | 1.8 | — | — | — |
| | A12 | 0.005 | 0.42 | 0.38 | 0.015 | 0.0019 | 17.1 | 0.006 | 0.13 | 0.42 | 0.0004 | 0.03 | — | — | 1.2 | — | — |
| | A13 | 0.006 | 0.44 | 0.15 | 0.030 | 0.0009 | 11.6 | 0.006 | 0.17 | — | 0.0004 | 0.07 | 0.1 | 0.1 | 0.1 | 0.13 | 0.0003 |
| | A14 | 0.005 | 0.06 | 0.16 | 0.031 | 0.0025 | 11.5 | 0.013 | 0.15 | — | 0.0006 | 0.05 | 0.7 | — | — | 0.18 | 0.0005 |
| | A15 | 0.014 | 0.16 | 0.23 | 0.026 | 0.0016 | 14.5 | 0.009 | 0.08 | 0.22 | 0.0006 | 0.05 | — | — | — | — | — |
| | A16 | 0.012 | 0.13 | 0.33 | 0.036 | 0.0009 | 17.6 | 0.012 | — | 0.36 | 0.0006 | 0.07 | 0.2 | — | 0.4 | — | — |
| | A17 | 0.013 | 0.15 | 0.22 | 0.026 | 0.0011 | 17.5 | 0.010 | — | 0.29 | — | — | — | 0.3 | — | — | — |
| | A18 | 0.055 | 0.41 | 0.45 | 0.032 | 0.0035 | 16.1 | 0.025 | — | — | — | 0.11 | — | — | 0.2 | 0.15 | 0.0005 |
| | A19 | 0.006 | 0.35 | 0.09 | 0.025 | 0.0009 | 19.5 | 0.017 | 0.17 | 0.22 | 0.0004 | 0.07 | 0.13 | 1.5 | 0.1 | 0.13 | 0.0003 |
| | A20 | 0.008 | 0.09 | 0.13 | 0.032 | 0.0017 | 17.1 | 0.015 | — | 0.33 | — | 0.03 | — | — | — | — | — |

| | | Composition (mass %) | | | | | | | | | Hot rolled plate/ |
|---|---|---|---|---|---|---|---|---|---|---|---|
| | No. | Sn | Sb | Zr | Ta | Hf | W | Co | Ca | REM | Ga | Hot rolled annealed plate |
| Invention example | A1 | — | — | — | — | — | — | — | — | — | — | Hot rolled annealed plate |
| | A2 | — | — | — | — | — | — | — | — | — | — | Hot rolled annealed plate |
| | A3 | — | — | — | — | — | — | — | — | — | — | hot rolled plate |

TABLE 1-1-continued

|     | | | | | | | | | | | |
|-----|---|---|---|---|---|---|---|---|---|---|---|
| A4  | — | — | — | — | — | — | — | — | — | — | Hot rolled annealed plate |
| A5  | — | — | — | — | — | — | — | — | — | — | Hot rolled annealed plate |
| A6  | — | — | — | — | — | — | — | — | — | — | Hot rolled annealed plate |
| A7  | — | — | — | — | — | — | — | 0.0005 | — | — | Hot rolled annealed plate |
| A8  | — | — | — | — | — | — | — | — | — | — | Hot rolled annealed plate |
| A9  | — | — | — | — | — | — | — | — | — | — | Hot rolled annealed plate |
| A10 | — | — | — | — | — | — | — | 0.0007 | — | — | hot rolled plate |
| A11 | — | — | — | — | — | — | — | — | — | — | Hot rolled annealed plate |
| A12 | — | — | — | — | — | — | — | — | — | — | Hot rolled annealed plate |
| A13 | — | — | — | — | — | — | — | — | — | — | hot rolled plate |
| A14 | — | — | — | — | 0.06 | — | — | 0.0018 | 0.01 | — | Hot rolled annealed plate |
| A15 | 0.12 | — | — | — | — | — | — | — | 0.02 | — | hot rolled plate |
| A16 | — | 0.15 | — | — | — | — | — | — | — | — | Hot rolled annealed plate |
| A17 | — | — | — | — | — | 1.50 | — | — | — | — | hot rolled plate |
| A18 | — | — | 0.09 | — | — | — | 0.09 | — | — | — | Hot rolled annealed plate |
| A19 | 0.06 | 0.05 | 0.07 | 0.05 | 0.05 | 0.06 | 0.05 | 0.0011 | 0.008 | — | Hot rolled annealed plate |
| A20 | — | — | — | — | — | — | — | — | — | 0.010 | Hot rolled annealed plate |

TABLE 1-2

| | No. | Composition (mass %) | | | | | | | | | | | | | |
|---|---|---|---|---|---|---|---|---|---|---|---|---|---|---|---|
| | | C | Si | Mn | P | S | Cr | N | Ti | Nb | B | Al | Ni | Mo | Cu | V |
| Comparative Examples | B1 | 0.092* | 0.24 | 0.37 | 0.020 | 0.0009 | 10.7 | 0.011 | — | — | — | — | — | — | — | — |
| | B2 | 0.005 | 1.56* | 0.25 | 0.020 | 0.0009 | 17.3 | 0.006 | 0.18 | — | 0.0009 | 0.09 | — | — | — | — |
| | B3 | 0.013 | 0.32 | 1.43* | 0.020 | 0.0012 | 14.5 | 0.010 | — | 0.35 | — | — | — | — | — | — |
| | B4 | 0.003 | 0.42 | 0.43 | 0.06* | 0.0002 | 16.3 | 0.010 | 0.12 | — | 0.0007 | 0.05 | — | — | — | — |
| | B5 | 0.007 | 0.26 | 0.32 | 0.019 | 0.0125* | 18.8 | 0.013 | 0.16 | — | — | — | — | — | — | — |
| | B6 | 0.012 | 0.31 | 0.34 | 0.040 | 0.0026 | 25.3* | 0.005 | — | — | 0.0005 | — | — | — | — | — |
| | B7 | 0.004 | 0.25 | 0.36 | 0.020 | 0.0015 | 17.5 | 0.06* | 0.22 | — | — | — | — | — | — | — |
| | B8 | 0.003 | 0.26 | 0.12 | 0.030 | 0.0053 | 14.1 | 0.015 | 0.46* | — | — | — | — | — | — | — |
| | B9 | 0.008 | 0.39 | 0.12 | 0.032 | 0.0035 | 16.2 | 0.005 | — | 0.65* | 0.0100* | — | — | — | — | — |
| | B10 | 0.009 | 0.29 | 0.26 | 0.010 | 0.0015 | 19.5 | 0.005 | — | — | 0.0035* | — | — | — | — | — |
| | B11 | 0.006 | 0.36 | 0.33 | 0.040 | 0.0033 | 11.1 | 0.007 | — | — | — | 0.36* | — | — | — | — |
| | B12 | 0.002 | 0.42 | 0.42 | 0.020 | 0.0032 | 13.8 | 0.006 | — | — | — | — | 1.5* | — | — | — |
| | B13 | 0.003 | 0.17 | 0.26 | 0.030 | 0.0013 | 16.5 | 0.012 | — | 0.25 | — | 0.04 | — | 2.6* | — | — |
| | B14 | 0.011 | 0.25 | 0.27 | 0.020 | 0.0023 | 11.9 | 0.006 | — | — | — | — | — | — | 3.3* | — |
| | B15 | 0.005 | 0.31 | 0.21 | 0.010 | 0.0016 | 13.5 | 0.010 | — | — | — | 0.03 | — | — | — | 1.2* |
| | B16 | 0.009 | 0.39 | 0.12 | 0.040 | 0.0022 | 14.5 | 0.013 | — | — | 0.0005 | — | — | — | — | — |
| | B17 | 0.006 | 0.21 | 0.33 | 0.030 | 0.0007 | 17.3 | 0.016 | — | — | — | — | — | — | — | — |
| | B18 | 0.005 | 0.32 | 0.17 | 0.050 | 0.0011 | 13.6 | 0.013 | — | — | — | 0.06 | — | — | — | — |
| | B19 | 0.005 | 0.21 | 0.25 | 0.010 | 0.0025 | 16.3 | 0.009 | — | — | — | 0.13 | — | — | — | — |
| | B20 | 0.056 | 0.13 | 0.65 | 0.016 | 0.0046 | 11.5 | 0.035 | — | — | — | — | — | — | — | — |
| | B21 | 0.043 | 0.96 | 0.95 | 0.025 | 0.0056 | 10.9 | 0.045 | — | — | — | — | — | — | — | — |
| | B22 | 0.055 | 0.85 | 0.35 | 0.035 | 0.0076 | 16.5 | 0.033 | — | — | — | — | — | — | — | — |
| | B23 | 0.063 | 0.65 | 0.64 | 0.019 | 0.0009 | 17.5 | 0.035 | — | — | — | — | — | — | — | — |
| | B24 | 0.042 | 0.43 | 0.56 | 0.037 | 0.0016 | 17.6 | 0.039 | — | — | — | — | — | — | — | — |
| | B25 | 0.009 | 0.33 | 0.13 | 0.015 | 0.0016 | 10.8 | 0.015 | 0.12 | — | — | — | — | — | — | — |
| | B26 | 0.008 | 0.13 | 0.31 | 0.025 | 0.0013 | 14.5 | 0.015 | 0.12 | — | — | — | — | — | — | — |

| | No. | Composition (mass %) | | | | | | | | | | | hot rolled plate/ Hot rolled annealed plate |
|---|---|---|---|---|---|---|---|---|---|---|---|---|---|
| | | Mg | Sn | Sb | Zr | Ta | Hf | W | Co | Ca | REM | Ga | |
| Comparative Examples | B1 | — | — | — | — | — | — | — | — | — | — | — | Hot rolled/annealed plate |
| | B2 | — | — | — | — | — | — | — | — | — | — | — | hot rolled plate |
| | B3 | — | — | — | — | — | — | — | — | — | — | — | Hot rolled annealed plate |
| | B4 | — | — | — | — | — | — | — | — | — | — | — | Hot rolled annealed plate |
| | B5 | — | — | — | — | — | — | — | — | — | — | — | Hot rolled annealed plate |
| | B6 | — | — | — | — | — | — | — | — | — | — | — | Hot rolled annealed plate |
| | B7 | — | — | — | — | — | — | — | — | — | — | — | Hot rolled annealed plate |
| | B8 | — | — | — | — | — | — | — | — | — | — | — | Hot rolled annealed plate |
| | B9 | — | — | — | — | — | — | — | — | — | — | — | hot rolled plate |
| | B10 | — | — | — | — | — | — | — | — | — | — | — | Hot rolled annealed plate |
| | B11 | — | — | — | — | — | — | — | — | — | — | — | Hot rolled annealed plate |
| | B12 | — | — | — | — | — | — | — | — | — | — | — | hot rolled plate |
| | B13 | — | — | — | — | — | — | — | — | — | — | — | Hot rolled annealed plate |
| | B14 | — | — | — | — | — | — | — | — | — | — | — | Hot rolled annealed plate |
| | B15 | — | — | — | — | — | — | — | — | — | — | — | hot rolled plate |
| | B16 | 0.0042* | — | — | — | — | — | — | — | — | — | — | Hot rolled annealed plate |
| | B17 | — | 0.45* | — | — | — | — | — | — | — | — | — | Hot rolled annealed plate |
| | B18 | — | — | 0.36* | — | — | — | — | — | — | — | — | Hot rolled annealed plate |
| | B19 | — | — | — | 0.2* | — | — | — | — | — | — | — | Hot rolled annealed plate |
| | B20 | — | — | — | — | 0.3* | — | — | — | — | — | — | Hot rolled annealed plate |
| | B21 | — | — | — | — | — | 0.2* | — | — | — | — | — | Hot rolled annealed plate |
| | B22 | — | — | — | — | — | — | 2.3* | — | — | — | — | Hot rolled annealed plate |

TABLE 1-2-continued

| | | | | | | | | | | | | |
|---|---|---|---|---|---|---|---|---|---|---|---|---|
| B23 | — | — | — | — | — | — | — | 0.3* | — | — | — | Hot rolled annealed plate |
| B24 | — | — | — | — | — | — | — | — | 0.0045* | — | — | Hot rolled annealed plate |
| B25 | — | — | — | — | — | — | — | — | — | 0.06* | — | Hot rolled annealed plate |
| B26 | — | — | — | — | — | — | — | — | — | — | 0.5* | Hot rolled annealed plate |

Notations
*show outside present invention.

TABLE 2-1

| | No. | Hot rolled plate/ Hot rolled annealed plate | <011> oriented grain ratio (%) | Ratio of low-angle grain boundary of less than 15° (%) | Impact value (J/cm$^2$) |
|---|---|---|---|---|---|
| Inv. ex. | A1 | Hot rolled annealed plate | 27 | 21 | 15 |
| | A2 | Hot rolled annealed plate | 33 | 45 | 15 |
| | A3 | Hot rolled plate | 21 | 20 | 12 |
| | A4 | Hot rolled annealed plate | 42 | 53 | 29 |
| | A5 | Hot rolled annealed plate | 22 | 23 | 15 |
| | A6 | Hot rolled annealed plate | 56 | 59 | 21 |
| | A7 | Hot rolled annealed plate | 72 | 62 | 20 |
| | A8 | Hot rolled annealed plate | 43 | 46 | 15 |
| | A9 | Hot rolled annealed plate | 35 | 39 | 19 |
| | A10 | Hot rolled plate | 20 | 22 | 11 |
| | A11 | Hot rolled annealed plate | 26 | 25 | 16 |
| | A12 | Hot rolled annealed plate | 21 | 23 | 13 |
| | A13 | Hot rolled plate | 20 | 18 | 14 |
| | A14 | Hot rolled annealed plate | 26 | 35 | 15 |
| | A15 | Hot rolled plate | 21 | 26 | 16 |
| | A16 | Hot rolled annealed plate | 35 | 39 | 17 |
| | A17 | Hot rolled plate | 20 | 19 | 12 |
| | A18 | Hot rolled annealed plate | 53 | 69 | 26 |
| | A19 | Hot rolled annealed plate | 45 | 56 | 27 |
| | A20 | Hot rolled annealed plate | 25 | 23 | 16 |

TABLE 2-2

| | No. | Hot rolled plate/ Hot rolled annealed plate | <011> oriented grain ratio (%) | Ratios of low-angle grain boundary of less than 15° (%) | Impact value (J/cm$^2$) |
|---|---|---|---|---|---|
| Comp. Ex. | B1 | Hot rolled annealed plate | 16* | 9* | 6 |
| | B2 | Hot rolled plate | 18* | 9* | 9 |
| | B3 | Hot rolled annealed plate | 15* | 7* | 7 |
| | B4 | Hot rolled annealed plate | 11* | 8* | 5 |
| | B5 | Hot rolled annealed plate | 16* | 6* | 7 |
| | B6 | Hot rolled annealed plate | 14* | 9* | 6 |
| | B7 | Hot rolled annealed plate | 15* | 9* | 8 |
| | B8 | Hot rolled annealed plate | 13* | 8* | 4 |
| | B9 | Hot rolled plate | 5* | 3* | 2 |
| | B10 | Hot rolled annealed plate | 18* | 2* | 10 |
| | B11 | Hot rolled annealed plate | 6* | 6* | 6 |
| | B12 | Hot rolled plate | 5* | 4* | 5 |
| | B13 | Hot rolled annealed plate | 4* | 3* | 4 |
| | B14 | Hot rolled annealed plate | 10* | 9* | 8 |
| | B15 | Hot rolled plate | 11* | 9* | 9 |
| | B16 | Hot rolled annealed plate | 16* | 9* | 7 |
| | B17 | Hot rolled annealed plate | 18* | 9* | 10 |
| | B18 | Hot rolled annealed plate | 5* | 7* | 6 |
| | B19 | Hot rolled annealed plate | 2* | 4* | 3 |
| | B20 | Hot rolled annealed plate | 2* | 4* | 1 |
| | B21 | Hot rolled annealed plate | 3* | 3* | 2 |
| | B22 | Hot rolled annealed plate | 4* | 4* | 4 |
| | B23 | Hot rolled annealed plate | 5* | 5* | 6 |
| | B24 | Hot rolled annealed plate | 6* | 4* | 5 |
| | B25 | Hot rolled annealed plate | 12* | 9* | 6 |
| | B26 | Hot rolled annealed plate | 10* | 9* | 3 |

Notations
*show outside present invention.

Table 2-1 and Table 2-2 show the results. In Table 2-2, the notation "*" shows outside the present invention. Further, "the ratio of the low-angle grain boundary of less than 15°" is the ratio of sum of the length of the low-angle grain boundary having a difference in crystal orientation of less than 15° at the cross-section at which the <011> oriented grain ratio was measured and the sum of the length of the crystal grain boundaries at the cross-section.

The Invention Examples A1 to A20 are hot rolled plates or hot rolled annealed steel sheets having the components of the present invention and produced by the method of production of the present invention. The Invention Examples A1 to A20 all have <011> oriented grain ratios of 20% or more, have ratios of the low-angle grain boundary of less than 15° of 10% or more, and impact values at 0° C. of 11 J/cm² or more. If steel having an impact values at 0° C. of 7 J/cm² or more, brittle fracture does not occur when the hot rolled coil is uncoiled and the plate is run, so it will be understood that the rolled ferritic stainless steel sheet of the present invention has sufficient toughness. As opposed to this, Comparative Examples B1 to B26 are hot rolled plates or hot rolled annealed steel sheets having some of the components outside the scope of the present invention. Comparative Examples B1 to B26 have <011> oriented grain ratios of less than 20%, ratios of the low-angle grain boundary of less than 15° of less than 10%, and impact values at 0° C. failing to reach 7 J/cm² in many cases.

The steels having the components of the present invention were used to manufacture coils while changing the hot rolling conditions and the annealing conditions as shown in Table 3. The results of evaluation are shown. The notations shown in the column of "Steel No." of Table 3 correspond to the numbers of the steel sheets shown in the "No." column of Table 1. That is, the steel sheets shown in Table 3 have the same compositions as the steel sheets of the corresponding numbers of Table 1 corresponding to the numbers shown in the "Steel No." column of Table 3 and were produced by the methods of production described in Table 3. The steel sheets of Invention Examples C1 to C24 of Table 3 are produced by the manufacturing conditions of the present invention and have excellent toughness. On the other hand, the steel sheets of Comparative Examples D1 to D6 have some of the manufacturing conditions outside the scope of the present invention. The <011> oriented grain ratios are less than 20%, the ratios of the low-angle grain boundary of less than 15° are less than 10%, and the impact values at 0° C. fail to reach 7 J/cm².

Figure 2:
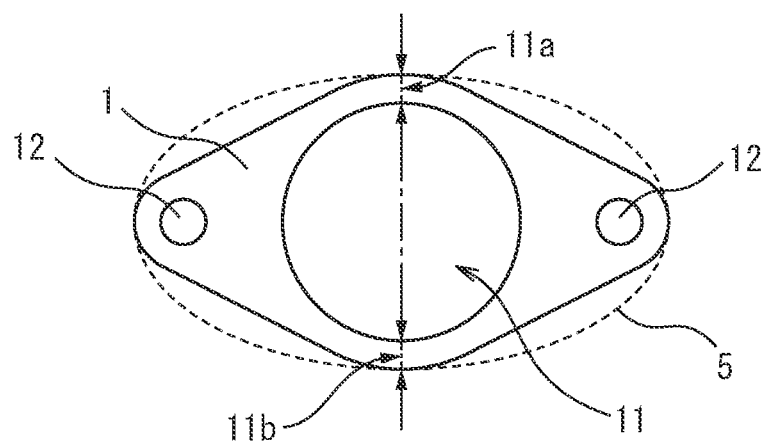
FIG. 2 is a front view of the flange part.

Further, the steel sheets of the Invention Examples C1 to C24 and the steel sheets of Comparative Examples D1 to D6 were used as materials to produce flange parts 1 of shapes symmetric to the left and right as shown in FIG. 2. Each flange part 1 was provided with a hole 11 having an inside diameter of a diameter of 55 mm at center thereof and holes 12 for passing bolts and other fastening hardware at the left and right of the hole 11. Above and below the hole 11, the thinnest edge parts 11a and 11b were formed symmetrically to the top and bottom about the center of the hole 11. Further, the ratio of the inside diameter of the hole 11 to the short axis of the oval 5 circumscribing the flange part was 0.65, while the ratio of the thickness of the edge parts 11a and 11b to the short axis of the oval 5 was 0.18 in each case.

Figure 3:
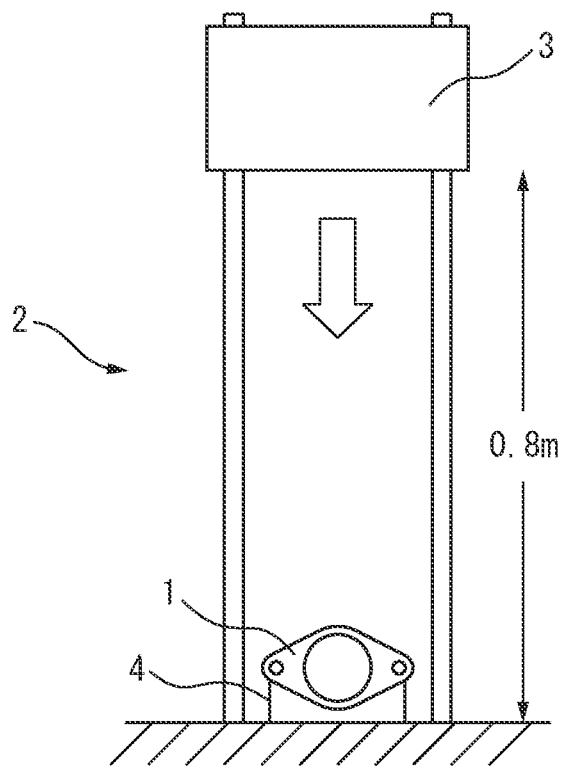
FIG. 3 is a schematic view showing a low temperature drop weight test method of a flange part of FIG. 2.

The flange part 1 was tested by a low temperature drop weight test using the low temperature drop weight test apparatus 2 shown in FIG. 3. The low temperature drop weight test was conducted using the drop weight test apparatus 2. First, a flange part 1 cooled to −20° C. was stood up and fastened on a fastening table 4 so that the thinnest parts 11a and 11b became the top end and bottom end. Next, a weight 3 of 16 kg was freely dropped on the side surface of the thin part 11a from a height 80 cm and the presence of any cracks of the flange part 1 was visually examined. In this case, the energy given to the flange part became 125 J. The flange part was cooled to −20° C. using a temperature and humidity testing chamber or using alcohol and liquid nitrogen to adjust the temperature, the sample was held at −20° C. for 10 minutes, then impact was applied.

The results of the low temperature dropping weight test are shown in Table 3. In Table 3, the notation "*" indicates outside the present invention. From Table 3, it will be understood that the flange parts produced by the Invention Examples C1 to C24 do not crack when given a 125 J or less impact energy at −20° C. In this way, according to the present invention, it is possible to provide a flange part excellent in low temperature toughness. As opposed to this, the hot rolled plates or hot rolled annealed plates produced by manufacturing conditions outside the scope of the present invention in Comparative Examples D1 to D6 cracked due to the impact energy and did not have sufficient toughness.

TABLE 3

| | | | Hot rolling conditions | | | Annealing conditions | | | Characteristics | | | |
| --- | --- | --- | --- | --- | --- | --- | --- | --- | --- | --- | --- | --- |
| | | | Finishing temp. (° C.) | Coiling temp. (° C.) | Thickness (mm) | Heating temp. (° C.) | Heating rate (° C./sec) | Cooling rate (° C./sec) | <011> orientation ratio (%) | Ratio of less than 15° low-angle grain boundaries (%) | Impact value (J/cm²) | Cracking in low temperature impact test of flange part |
| | No. | Steel | | | | | | | | | | |
| Invention example | C1 | A1 | 830 | 470 | 8 | 880 | 16 | 20 | 27 | 21 | 15 | No |
| | C2 | A1 | 830 | 470 | 8 | No annealing | | | 35 | 33 | 21 | No |
| | C3 | A2 | 810 | 450 | 8 | 820 | 12 | 19 | 33 | 35 | 15 | No |
| | C4 | A2 | 810 | 450 | 13 | 820 | 15 | 21 | 31 | 34 | 14 | No |
| | C5 | A2 | 810 | 450 | 13 | No annealing | | | 42 | 49 | 30 | No |
| | C6 | A4 | 840 | 350 | 5 | 1000 | 15 | 16 | 45 | 59 | 31 | No |
| | C7 | A4 | 840 | 350 | 8 | 970 | 17 | 18 | 42 | 53 | 29 | No |
| | C8 | A4 | 840 | 350 | 13 | 950 | 16 | 25 | 40 | 46 | 27 | No |
| | C9 | A4 | 840 | 350 | 8 | No annealing | | | 53 | 68 | 35 | No |
| | C10 | A5 | 820 | 400 | 13 | 940 | 19 | 15 | 22 | 29 | 16 | No |
| | C11 | A5 | 820 | 400 | 13 | No annealing | | | 35 | 38 | 23 | No |
| | C12 | A6 | 860 | 400 | 5 | 990 | 20 | 17 | 60 | 73 | 25 | No |
| | C13 | A6 | 860 | 400 | 8 | 970 | 20 | 23 | 56 | 66 | 21 | No |
| | C14 | A6 | 860 | 400 | 13 | 950 | 18 | 19 | 50 | 59 | 18 | No |
| | C15 | A6 | 860 | 400 | 5 | No annealing | | | 67 | 86 | 36 | No |
| | C16 | A7 | 805 | 420 | 5 | 1000 | 18 | 21 | 75 | 81 | 24 | No |
| | C17 | A7 | 805 | 420 | 8 | 960 | 15 | 20 | 72 | 82 | 20 | No |
| | C18 | A7 | 805 | 420 | 13 | 940 | 15 | 16 | 60 | 66 | 16 | No |
| | C19 | A7 | 805 | 420 | 8 | No annealing | | | 75 | 80 | 39 | No |
| | C20 | A8 | 860 | 330 | 8 | 970 | 25 | 15 | 43 | 40 | 15 | No |

TABLE 3-continued

|  | No. | Steel | Hot rolling conditions | | | Annealing conditions | | | <011> orientation ratio (%) | Ratio of less than 15° low-angle grain boundaries (%) | Impact value (J/cm²) | Cracking in low temperature impact test of flange part |
|---|---|---|---|---|---|---|---|---|---|---|---|---|
|  |  |  | Finishing temp. (° C.) | Coiling temp. (° C.) | Thickness (mm) | Heating temp. (° C.) | Heating rate (° C./sec) | Cooling rate (° C./sec) |  |  |  |  |
|  | C21 | A8 | 860 | 330 | 8 | No annealing | | | 52 | 38 | 25 | No |
|  | C22 | A9 | 880 | 330 | 5 | 970 | 23 | 30 | 26 | 26 | 24 | No |
|  | C23 | A9 | 880 | 330 | 5 | No annealing | | | 33 | 30 | 29 | No |
|  | C24 | A10 | 880 | 300 | 8 | 970 | 20 | 24 | 20 | 25 | 11 | No |
| Comparative example | D1 | A1 | 750* | 470 | 8 | 880 | 16 | 20 | 15* | 9* | 6 | Yes |
|  | D2 | A2 | 810 | 550* | 8 | 820 | 12 | 19 | 18* | 9* | 5 | Yes |
|  | D3 | A4 | 840 | 350 | 8 | 750* | 17 | 18 | 10* | 8* | 4 | Yes |
|  | D4 | A5 | 820 | 400 | 13 | 1050* | 19 | 15 | 8* | 7* | 3 | Yes |
|  | D5 | A6 | 860 | 400 | 5 | 990 | 5* | 17 | 18* | 9* | 6 | Yes |
|  | D6 | A8 | 860 | 330 | 8 | 970 | 25 | 5* | 10* | 9* | 4 | Yes |

Note that, the other conditions in the manufacturing apparatus or manufacturing process may be suitably selected. For example, the hot rolling apparatus may be a continuous type tandem mill or reverse type mill. A Steckel mill having a heating device may also be used in the middle of rolling. The slab thickness, hot rolled plate thickness, etc. may also be suitably designed. After hot rolling and coiling, the steel may also be dipped in a water cooling pool. For the pickling after hot rolling or after hot rolling and annealing, the shot blast, bending, brush, or other mechanical descaling method may be suitably selected. For the acid solution, sulfuric acid, nitrofluoric acid, or other existing acid solution may be used. Furthermore, after this, coil grinding, shot blasting, painting, plating, or other various surface treatments may be applied.

INDUSTRIAL APPLICABILITY

As clear from the above explanation, the rolled ferritic stainless steel material of the present invention is excellent in manufacturability and secures toughness at the time of flange-making and at the time of use. That is, by using the material applying the present invention in particular for an automobile or motorcycle part, reliability is secured and the degree of social contribution can be raised. The invention is extremely beneficial to industry.

REFERENCE SIGNS LIST 1. flange part
2. drop weight test apparatus
3. weight
4. fastening table
11. hole
11a, 11b. edge parts
5. circumscribing oval

The invention claimed is:

1. A method of production of a hot rolled steel sheet or a hot rolled steel strip comprised of ferritic stainless steel, comprising performing a hot rolling process making a hot rolling finishing temperature 805° C. to 880° C. and a coiling process at a coiling temperature of 300 to 470° C. or less,
   wherein the hot rolled steel sheet or the hot rolled steel strip comprises ferritic stainless steel material containing, by mass %, C: 0.001 to 0.08%, Si: 0.01 to 1.0%, Mn: 0.01 to 1.0%, P: 0.01 to 0.05%, S: 0.0002 to 0.01%, Cr: 10.0 to 25.0%, and N: 0.001 to 0.05%, having a balance of Fe and unavoidable impurities, having a thickness of 5 mm or more, and having an area ratio of crystal grains with a <011> direction within 15° from the rolling direction of 20% or more in a cross-section parallel to the rolling direction at any location between the left and right ends of the steel sheet,
   wherein the hot rolled steel sheet or hot rolled steel strip each have a Charpy impact value measured at 0° C. based on JISZ2242 of 11 J/cm² or more.

2. The method of production of the hot rolled steel sheet or the hot rolled steel strip comprised of ferritic stainless steel according to claim 1, wherein in a cross-section parallel to the rolling direction at any location between the left and right ends of the steel sheet, a sum of the lengths of low-angle grain boundaries with a crystal misorientation of less than 15° is 10% or more with respect to a sum of lengths of the crystal grain boundaries.

3. The method of production of the hot rolled steel sheet or the hot rolled steel strip comprised of ferritic stainless steel according to claim 1, wherein the hot rolled steel sheet or the hot rolled steel strip comprised of ferritic stainless steel further contains, by mass %, one or more of Ti: 0.01 to 0.4%, Nb: 0.01 to 0.6%, B: 0.0002 to 0.0030%, Al: 0.005 to 0.3%, Ni: 0.1 to 1%, Mo: 0.1 to 2.0%, Cu: 0.1 to 3.0%, V: 0.05 to 1.0%, Mg: 0.0002 to 0.0030%, Sn: 0.01 to 0.3%, Sb: 0.01 to 0.3%, Zr: 0.01 to 0.1%, Ta: 0.01 to 0.1%, Hf: 0.01 to 0.1%, W: 0.01 to 2.0%, Co: 0.01 to 0.2%, Ca: 0.0001 to 0.0030%, REM: 0.001 to 0.05%, and Ga: 0.0002 to 0.1%, and having an Mn content of 0.01 to 0.5%.

4. The method of production of the hot rolled steel sheet or the hot rolled steel strip comprised of ferritic stainless steel according to claim 1, wherein the hot rolled steel sheet or hot rolled steel strip comprised of ferritic stainless steel is used as a flange part.

5. The method of production of the hot rolled steel sheet or the hot rolled steel strip comprised of ferritic stainless steel according to claim 1, wherein in the hot rolled steel sheet or a hot rolled steel strip comprised of ferritic stainless steel material the Cr content is in a range from 10.0 to 18.0% by mass %.

6. The method of production of the hot rolled steel sheet or the hot rolled steel strip comprised of ferritic stainless steel according to claim 5, wherein in a cross-section parallel to the rolling direction at any location between the left and right ends of the steel sheet, a sum of the lengths of low-angle grain boundaries with a crystal misorientation of less than 15° is 10% or more with respect to a sum of lengths of the crystal grain boundaries.

7. The method of production of the hot rolled steel sheet or the hot rolled steel strip comprised of ferritic stainless steel according to claim 5 or 6, wherein the hot rolled steel sheet or hot rolled steel strip comprised of ferritic stainless steel material further contains, by mass %, one or more of Ti: 0.01 to 0.4%, Nb: 0.01 to 0.6%, B: 0.0002 to 0.0030%, Al: 0.005 to 0.3%, Ni: 0.1 to 1%, Mo: 0.1 to 2.0%, Cu: 0.1 to 3.0%, V: 0.05 to 1.0%, Mg: 0.0002 to 0.0030%, Sn: 0.01 to 0.3%, Sb: 0.01 to 0.3%, Zr: 0.01 to 0.1%, Ta: 0.01 to 0.1%, Hf: 0.01 to 0.1%, W: 0.01 to 2.0%, Co: 0.01 to 0.2%, Ca: 0.0001 to 0.0030%, REM: 0.001 to 0.05%, and Ga: 0.0002 to 0.1%, and having an Mn content of 0.01 to 0.5%.

* * * * *